United States Patent [19]

Tomlinson et al.

[11] 4,321,831
[45] Mar. 30, 1982

[54] DIGITALLY COMPATIBLE OPTICAL PRESSURE MEASUREMENT

[75] Inventors: Richard G. Tomlinson, Glastonbury; William H. Glenn, Vernon, both of Conn.

[73] Assignee: United Technologies Corporation, Hartford, Conn.

[21] Appl. No.: 191,194

[22] Filed: Sep. 26, 1980

[51] Int. Cl.³ .............................................. G01L 11/00
[52] U.S. Cl. ...................................... 73/705; 73/730; 73/800; 356/33
[58] Field of Search ........................ 73/705, 730, 800; 356/33

[56] References Cited

U.S. PATENT DOCUMENTS

| | | | |
|---|---|---|---|
| 3,950,987 | 4/1976 | Slezinger et al. | 73/705 |
| 4,010,632 | 3/1977 | Slezinger et al. | 73/800 |
| 4,171,908 | 10/1979 | Robert et al. | 73/800 |
| 4,270,050 | 5/1981 | Brogardh | 73/800 |

*Primary Examiner*—Donald O. Woodiel
*Attorney, Agent, or Firm*—Eric W. Petraske

[57] ABSTRACT

An apparatus for pressure measurement employs fiber optics to transport a broadband beam light to and from a remote electrically passive sensing head. In the sensing head, a linearly polarized beam is phase shifted in a birefringent plate, then passed through a photoelastic pressure sensor and a polarization analyzer. The wavelength for which the output light has an intensity minimum is a measure of the applied pressure.

5 Claims, 3 Drawing Figures

DIGITALLY COMPATIBLE OPTICAL PRESSURE MEASUREMENT

DESCRIPTION

1. Technical Field

The field of the invention is the measurement of pressure by means of an optical, electrically passive sensor head, connected to a remote electronic unit by a fiber optic cable.

2. Background Art

A copending application of the same inventors, assigned to a common assignee, discloses the use of the pressure dependence of the photoelastic effect in an analog device that measures the intensity of two linearly polarized components of an optical beam to form a measurement of the index of refraction difference for the two components, a quantity that is directly related to the pressure. That device, however, suffers from a difficulty common to analog measurements—the necessity of making high precision analog measurements repeatably over a period of time. Lyot filters are known in the optical art for using birefringent plates to produce a narrow-band filter.

DISCLOSURE OF INVENTION

The invention relates to a device for measuring pressure using an optical light source and detector, connected to a remote, electrically passive, sensor head by a fiber optic cable, in which the wavelength dependence of the photoelastic effect is employed as a pressure dependent characteristic, in order to produce a measurement that does not depend on precise amplitude measurements, and which is compatible with a digital lead-out.

BEST MODE FOR CARRYING OUT THE INVENTION

In a device in which a beam of linearly polarized light is traveling along a first axis, called the Z axis, through a set of optical elements that includes a pressure responsive block of material having an appropriate photoelastic stress-optical coefficient, to which pressure is to be applied along a predetermined pressure axis, bracketed by a pair of polarizing elements having their axes oriented at the same angle, illustratively 45°, with respect to the predetermined axis (all of the foregoing axes being perpendicular to the Z axis for convenience), the intensity of the transmitted light component polarized along the pressure axis is $$I = I_o \cos^2 \theta, \text{ where} \quad (1)$$

$$\theta = (\pi l C / \lambda)(P_x - P_y), \text{ where}$$

$n_x$ = index of refraction for light polarized along the pressure axis (the X axis)
$n_y$ = index of refraction for light polarized along the Y axis (perpendicular to the X and Z axes)
$l$ = path length for light transmitted through the sensor block
$\lambda$ = wavelength of the light
$C$ = photoelastic stress-optical coefficient of the material
$P_x$ = pressure applied along the X axis
$P_y$ = pressure applied along the Y axis (which may be atmospheric pressure)

Figure 1:
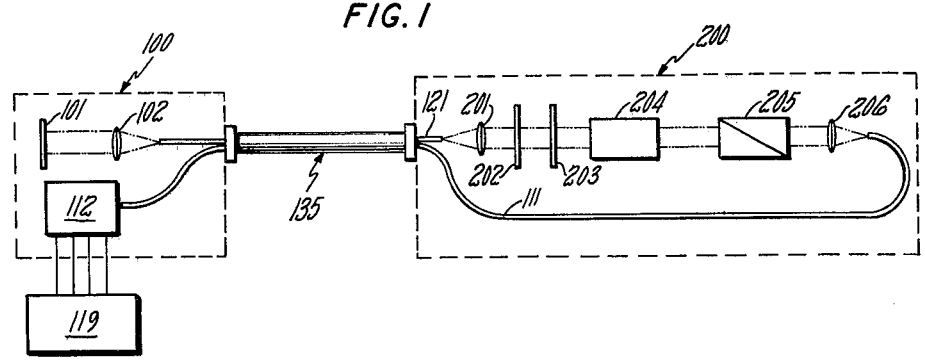
FIG. 1 shows, in partially pictorial, partially schematic form, an embodiment of the invention.

In the embodiment of FIG. 1, an additional element is added to the foregoing combination, in the form of a normally birefringent element (such as a quartz waveplate) inserted between the polarizer and the pressure sensitive element. The transmitted light is then $$I_x = I_o \cos^2(\psi), \text{ where} \quad (2)$$

$$\psi = \theta + \phi,$$

$$\theta = \frac{\pi l_2 C}{\lambda}(P_x - P_y) \text{ and} \quad (3)$$

$$\phi = \frac{\pi l_1}{\lambda}(n_x - n_y), \text{ where} \quad (4)$$

$l_1$ = length of the light path through the birefringent element, $n_x$ and $n_y$ are the indices of refraction in the birefringent element and $l_2$ = length of the light path through the pressure sensitive element. $I_x$ will be 0 when $\psi = (2N-1)\pi/2$. At zero pressure, $\psi$ will be equal to $\theta$ and will vary by an amount $\Delta\psi$. In the range $\pi/2 < \Delta\psi < \pi$ there will be one value of $\lambda$ for which $I_x$ is 0, given by $$\lambda_o = 2l_1 C(P_x - P_y) + 2l_2(n_x - n_y)$$

If, then, a broadband light beam is directed through this system, the output light will have a minimum in intensity for a wavelength $\lambda_o$ for which $\psi = \pi/2$ and the value of $\lambda_o$ depends on the pressure difference $P_x - P_y$ if $P_y$ is the atmosphere, then $P_x$ is the gauge pressure; if $P_y$ is 0, then $P_x$ is the absolute pressure). The length $l_1$ of the birefringent element may be varied to put $\psi$ in a pressure range of interest. The length $l_2$ and constant $C$ of the pressure sensitive element may also be selected to affect the sensitivity and range.

In the embodiment of the invention shown in FIG. 1, pressure sensor head 200 is connected to electrical generation and analysis unit 100 by fiber optic cable 135. In unit 100, a broadband light source 101 produces light having wavelengths spanning the range of interest, which light need not, for some applications, be continuous in frequency. The light is focused by lens 102 into optical fiber 121 which passes through connector 131, fiber optical cable 135, connector 132 and is collimated by lens 201. The collimater beam is linearly polarized by polarizer 202 oriented at 45° to the axis along which force is to be applied to the pressure sensing element, is modified in birefringent plate 203 located downbeam from polarizer 202, passes through pressure sensitive element 204 located downbeam of plate 203 and is then polarization analyzed in polarizer 205 located downbeam of element 204 from which it is focused into fiber 111 by lens 206 and passes back to a wavelength dispersing unit 112 from which electrical signals representing the light intensity as a function of wavelength of the modified beam pass to electrical circuits 119, illustratively a microcomputer.

As the light passes through element 204, the intensity transmitted along the stress axis varies according to equation (2) as a function of wavelength, having a minimum or dip at some wavelength $\lambda_o = \lambda_o(P_x)$ dependent on the pressure applied along that axis. An advantageous feature of the invention is that the shape of the input spectrum and the frequency dispersion of the optical elements are unimportant since we are looking for the location of a minimum or dip, not for the absolute value of the intensity. A further advantageous feature is that intensity changes associated with uncoupling and recoupling optical connectors 131 and 132 do not adversely affect the performance.

In an illustrative embodiment element 204 is lucite having $C = 3 \times 10^{-8}$ 1/psi and having a length of 5 cm and the birefringent element is a half-waveplate ($\pi/2$ phase shift in $I_x$) at $\lambda = 4,000$ A°, then $\psi = \pi/2$ for $\lambda_o = 3 \times 10^{-7} (P_x - P_y) + 4 \times 10^{-5}$ cm and, if $P_y$ is the atmospheric pressure, $\lambda_o$ is linearly dependent on the gauge pressure, $P_x$. Some values of the minimum intensity or dip wavelength are given in Table 1.

TABLE 1

| P (gauge) | $\lambda_o$ | |
|---|---|---|
| 0 | 4,000 | A° |
| 10 | 4,300 | A° |
| 100 | 7,000 | A° |
| 200 | 10,000 | A° |

Figure 2:
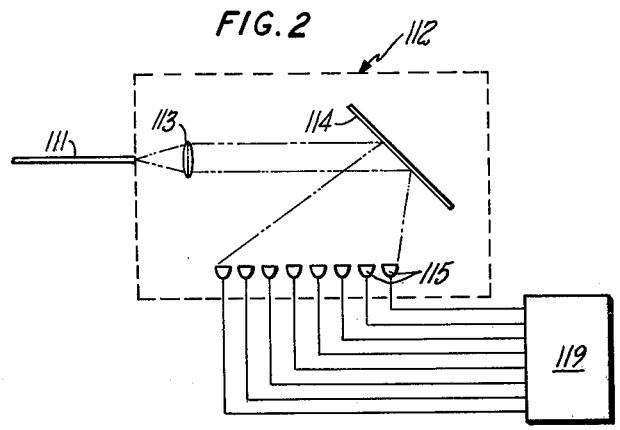
FIG. 2 shows the frequency-measuring component of the embodiment of FIG. 1.

In FIG. 2, a simple version of wavelength dependent measuring unit 112 is illustrated, in which light emerges from fiber 111, is collimated by lens 113 and dispersed by grating 114 (a prism could also be used) into a set of detectors 115, the outputs of which are analyzed in circuits 119 to look for the null. Circuits 119 may simply compare detector outputs, storing the location having the lowest value, or it may fit a smooth curve through the set of detector output values and calculate the minimum. Many other wavelength dependent measuring devices are well known in the art and may be substituted for this embodiment. It is an advantageous feature of the embodiment of FIG. 2 that the output is inherently digital, i.e. that it is one discrete number associated with a particular wavelength band. This output is well adapted for use with digital computers and control systems and avoids the problems of calibration and drift that are inherent in analog systems.

In addition to pressure measurement, the invention is well adapted to use in a feedback control system. For example, circuits 119 could compute the difference between the detectors next to the minimum or dip position and use the difference signal to regulate the pressure being monitored.

It will be evident to those skilled in the art that broadband light source 101 may be replaced with a narrow band tunable source, or by a set of light sources differing wavelengths and that wavelength dependent measuring devices may then be replaced by a simple detector so that the dip will be located as the light source frequency is varied.

Figure 3:
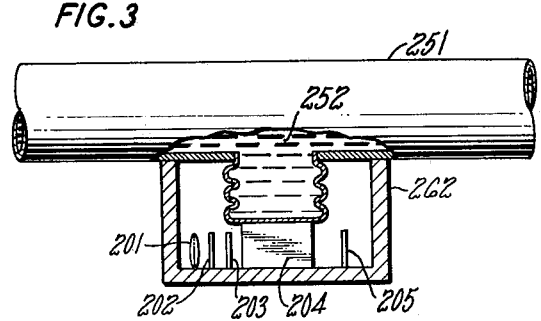
FIG. 3 shows a method of mounting the pressure-responsive element of the invention.

FIG. 3 shows in more detail a suitable mounting for the case in which an absolute pressure is to be measured. Pipe 251 encloses fluid 252, which may be a liquid or a gas, the pressure of which is to be measured. Bellows 261 having a flat bottom pressing against block 204 permits the contraction of block 204 in response to the pressure. Mounting chamber 262, which supports block 204 against the pressure and also supports the other components is evacuated so that pressure $P_y$ is zero. The input and exit fibers pass through optical feed-through connectors not shown. The surface of mounting 262 serves as an alignment reference. For convenience in alignment, bellows 261 should be constructed so that the fluid pressure is directed along an axis perpendicular to the surface of mounting 262, thus defining the principal stress axis of the device. Prism 205 then is mounted on the same surface with its axis at forty five degrees with respect to the stress axis. Conventionally, the stress axis is perpendicular to the direction of travel of the light beam, so that orthogonal coordinates may be used.

Because the block 204 responds to the difference between the pressures applied to the two axes, it is naturally suited to measure differential pressure. In such a case, the detail in FIG. 2 would be modified so that block 204 would be braced in two directions, mounting chamber 262 would no longer be evacuated and a pipe would be run from the second fluid to support a second bellows oriented at a right angle with respect to bellows 261. If desired, an equivalent, mechanically simpler, arrangement would be to move polarization analyzing prism 205 further away from block 204 and to insert a second block 204' between block 204 and prism 205. The transmitted light in this arrangement would be unchanged from the previous embodiment. The orientation of the second stress axis would still be at a right angle with respect to the axis along which bellows 261 applies force. In some applications, it may be desirable to measure the sum of two pressures, in which case support 262 would be modified by making an opening so that force could be applied to the face of block 204 opposite to that upon which bellows 261 presses. Other embodiments in which mechanical pressure is measured will be evident to those skilled in the art.

Although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. An apparatus for measuring pressure exerted along a predetermined stress axis comprising:
   (a) means for directing a beam of light comprising at least one predetermined wavelength in a predetermined wavelength range along an optic axis;
   (b) a plurality of optical elements intersecting said beam and disposed along said optic axis, comprising:
      (i) a first polarizing element having a first polarization axis oriented at a predetermined angle with respect to said stress axis,
      (ii) a second polarizing element oriented parallel to said first polarizing element,
      (iii) a pressure sensing element of photoelastic material, responsive to pressure applied along said stress axis, mounted intermediate said first and second polarizing elements, for modifying said light beam in response to said applied pressure,
      (iv) a birefringent plate disposed intermediate said first polarizing element and said pressure sensing element;
   (c) means responsive to light intensity for analyzing light emerging from said second polarizing element and identifying a dip wavelength within said wavelength range for which said emerging light has an intensity minimum, which wavelength provides a measure of said applied pressure.

2. An apparatus according to claim 1, in which said means for directing a beam of light further comprises a light source generating an output spectrum having a plurality of wavelengths within said wavelength range, and in which said means responsive to light intensity further comprises wavelength dependent means for identifying said dip wavelength.

3. An apparatus according to claim 1, in which said means for directing a beam of light further comprises means for generating a plurality of wavelengths within said wavelength range and in which said means responsive to light intensity is substantially wavelength independent.

4. An apparatus according to claim 2 or 3, in which said birefringent plate is a half-wavelength plate.

5. An apparatus according to claim 2, in which said wavelength dependent means comprises a wavelength dispersive element for directing differing wavelengths of said emerging light onto a plurality of optical detectors and means for identifying which of said detectors receives light of said dip wavelength.

* * * * *